United States Patent
Dalen

(10) Patent No.: US 6,682,082 B1
(45) Date of Patent: Jan. 27, 2004

(54) REMOVABLE BIDIRECTIONAL SKIS FOR TRAILERS AND THE LIKE

(76) Inventor: Steven Lloyd Dalen, 18059 40th St. North, Georgetown, MN (US) 56546

( * ) Notice: Subject to any disclaimer, the term of this patent is extended or adjusted under 35 U.S.C. 154(b) by 105 days.

(21) Appl. No.: 10/051,795

(22) Filed: Jan. 16, 2002

Related U.S. Application Data

(60) Provisional application No. 60/261,374, filed on Jan. 16, 2001.

(51) Int. Cl.[7] .............................................. B62B 19/02
(52) U.S. Cl. ........................... 280/7.12; 280/10; 280/13
(58) Field of Search .............................. 280/7.12, 8, 9, 280/10, 611, 414.1, 415.1, 13, 28, 28.5

(56) References Cited

U.S. PATENT DOCUMENTS

| | | | | |
|---|---|---|---|---|
| 791,343 A | * | 5/1905 | Holtman | 280/13 |
| 1,438,326 A | * | 12/1922 | Nelson | 280/13 |
| 2,237,471 A | * | 4/1941 | Billings | 280/13 |
| 2,352,966 A | * | 7/1944 | Morando | 280/8 |
| 2,589,602 A | * | 3/1952 | Clark | 280/13 |
| 2,741,486 A | * | 4/1956 | Torgrimson | 280/13 |
| 2,818,265 A | * | 12/1957 | Calderwood | 280/13 |
| 2,883,204 A | * | 4/1959 | Tomasovich | 280/13 |
| 3,321,211 A | * | 5/1967 | Bryant et al. | 280/13 |
| 3,521,897 A | * | 7/1970 | Fester et al. | 280/13 |
| 3,649,040 A | * | 3/1972 | Snider, Jr. | 180/183 |
| 3,756,615 A | * | 9/1973 | Bray | 280/14 |
| 3,774,926 A | * | 11/1973 | Chase | 280/13 |
| 3,901,525 A | * | 8/1975 | O'Brien et al. | 180/183 |
| 4,577,876 A | * | 3/1986 | Harris | 280/13 |
| 5,082,307 A | * | 1/1992 | Hollingworth, Jr. | 280/124.17 |
| 6,474,660 B1 | * | 11/2002 | Warren | 280/7.12 |

* cited by examiner

Primary Examiner—Brian L. Johnson
Assistant Examiner—Bridget Avery
(74) Attorney, Agent, or Firm—Curtis Harr

(57) ABSTRACT

A wide ski-like apparatus is provided that can be easily and quickly attached to the axle, or axles, of the larger sized icehouses and trailers in common use today. This is accomplished by the use of a ski-like apparatus that is attached to a wheel rim that corresponds in size and lug pattern to existing rims. A second embodiment attaches directly to the wheels of the trailer or icehouse. The use of skis on snow covered or icy surfaces reduces the amount of friction created by movement of the icehouse and thus, makes it easier to move it into position on the lake or river's frozen surface.

10 Claims, 4 Drawing Sheets

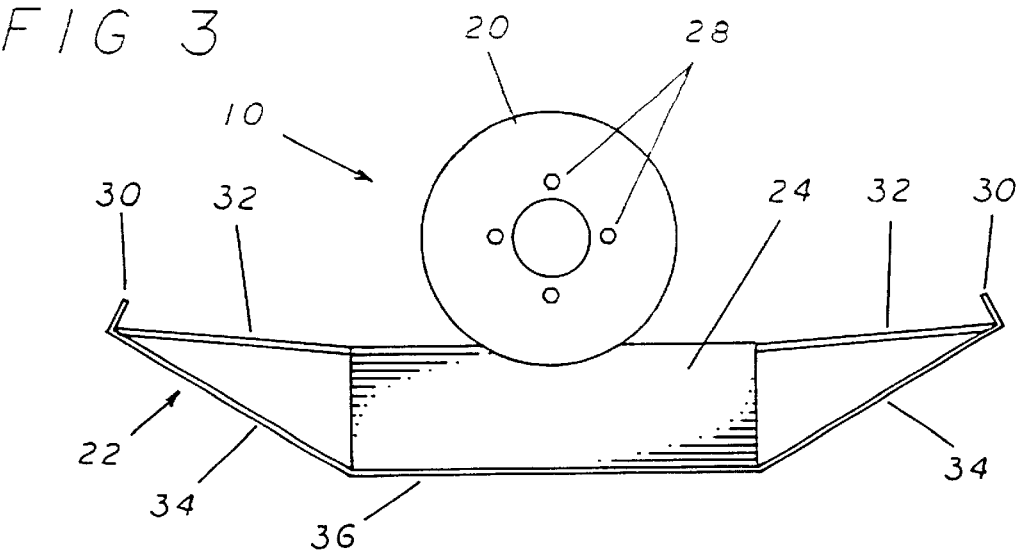
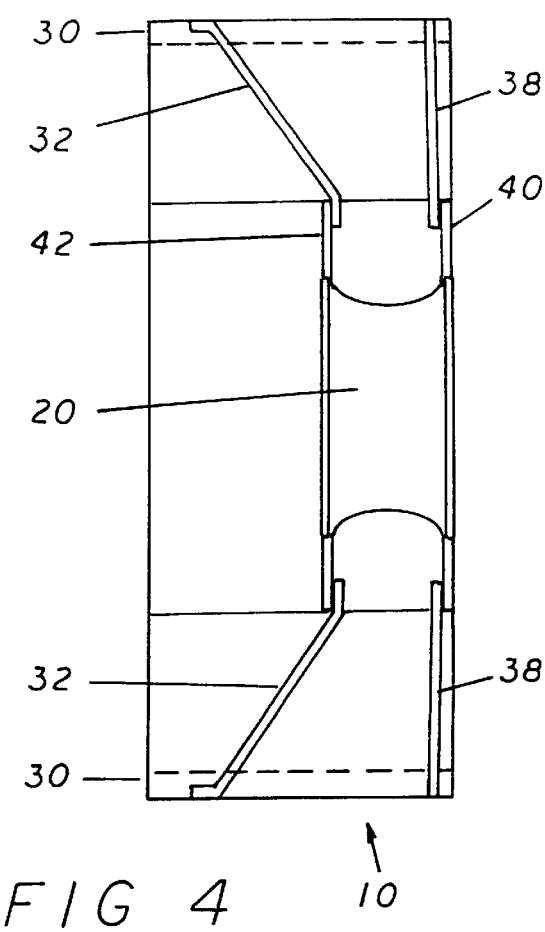
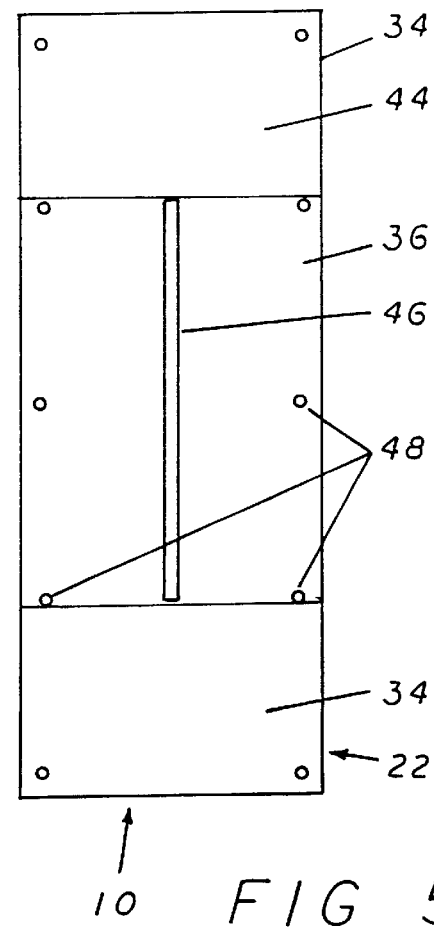
FIG 3
FIG 4
FIG 5

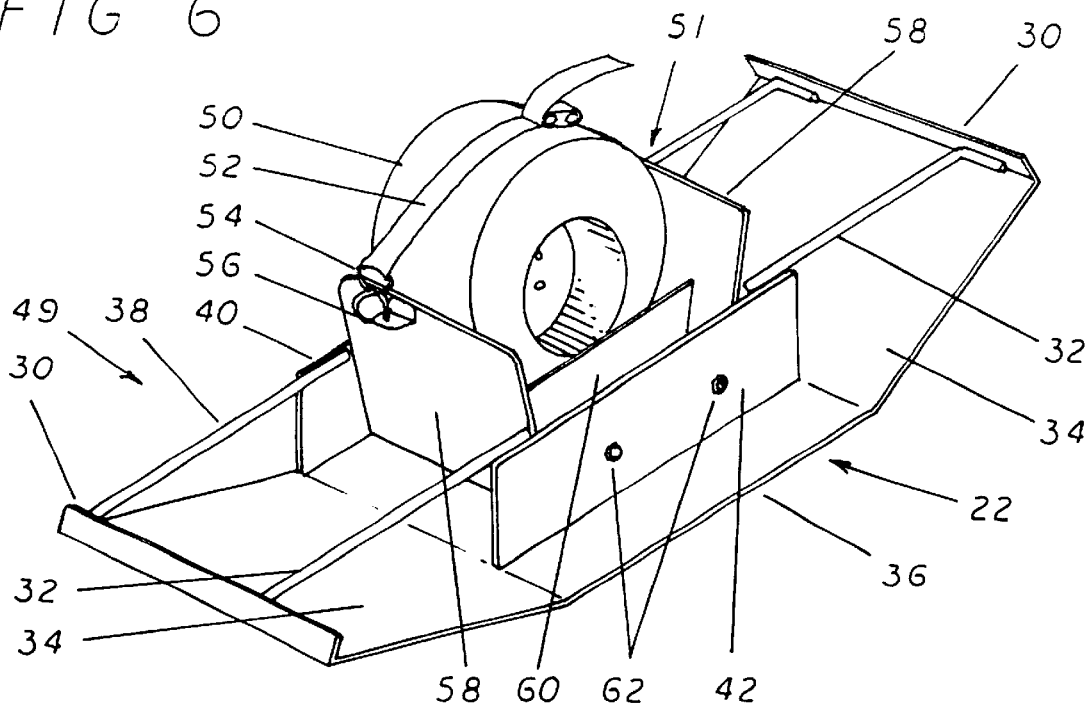
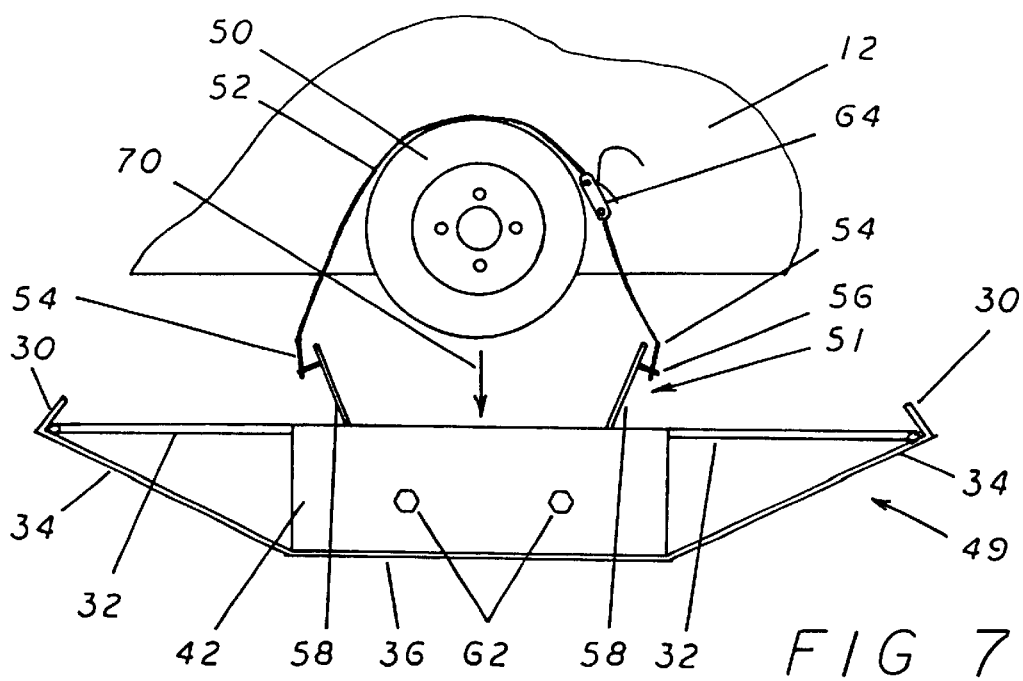

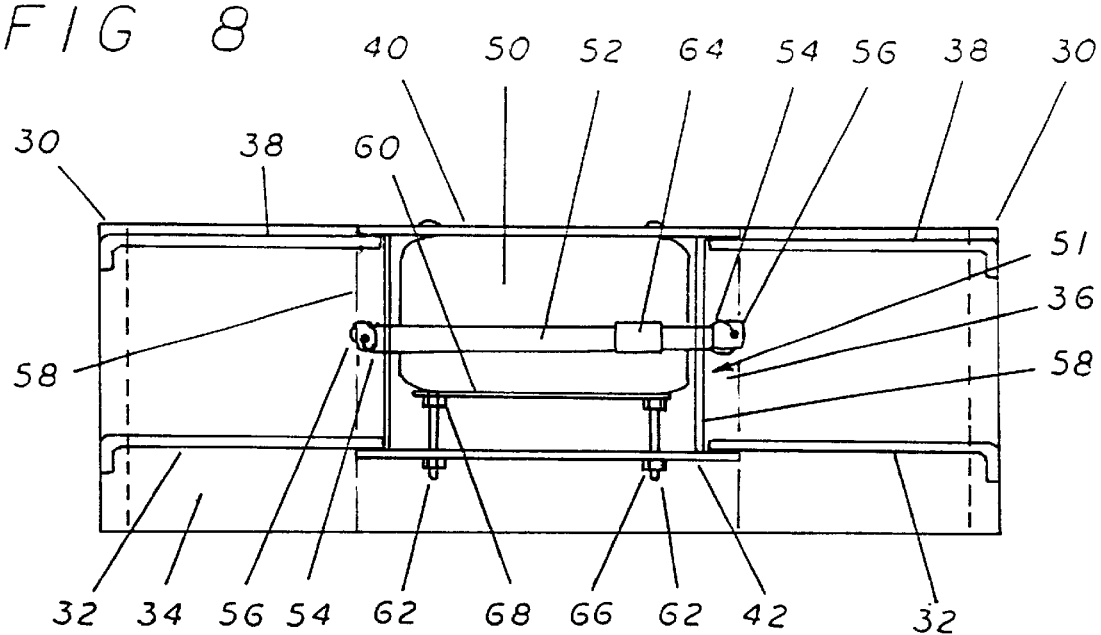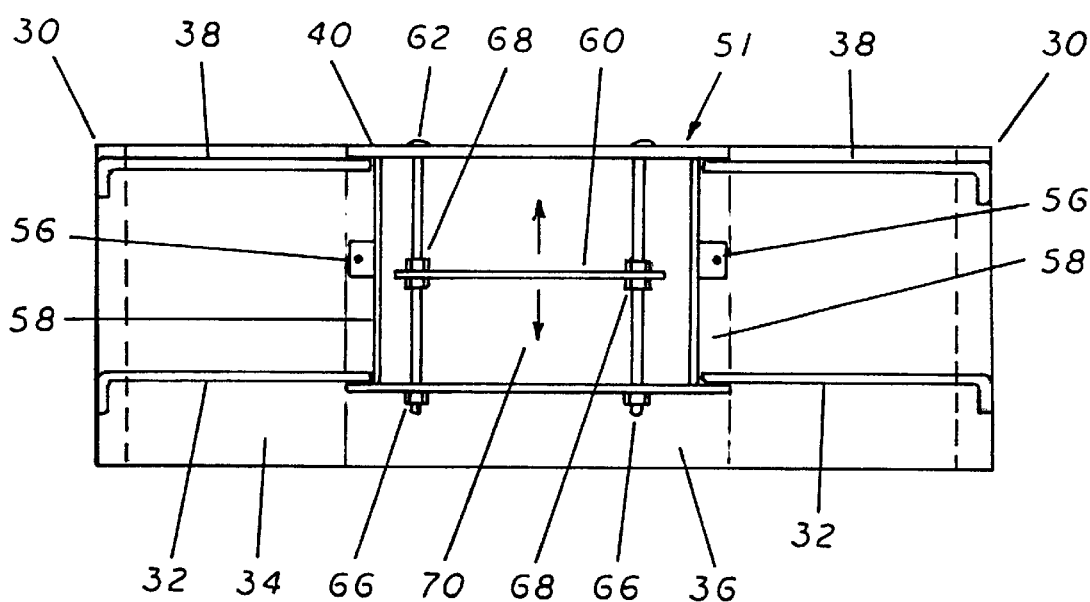

REMOVABLE BIDIRECTIONAL SKIS FOR TRAILERS AND THE LIKE

This application claims the benefit of U.S. Provisional Application No. 60/261,374 filed Jan. 16, 2001.

BACKGROUND OF THE INVENTION

The present invention relates to an improvement in the methods used to transport many types of small trailers such as ice fishing shelters, more commonly (and herein after) referred to as icehouses, and snowmobile trailers over snow covered and icy surfaces. More specifically, to a method of attaching the required number of skis to such a trailer by replacing a wheel on the vehicle or attaching a ski to the wheel by some alternative manner in such a way that does not necessitate any modifications to the trailer and which can be easily accomplished by an individual.

In the past, people have encountered a number of circumstances where it was necessary to transport a wheeled trailer over a snow packed or icy surface. The first of these was in positioning an icehouse in the desired location on the frozen surface of a lake or river. With this purpose in mind it was very common to mount fishing shelters or icehouses on wheels. These shelters are often moved out onto the ice at the beginning of the fishing season, may be moved about the ice during the season and then removed from the ice at the end of the season before the ice disappears. As ice fishing has gained in popularity, the size of shelters has increased accordingly requiring that many icehouses have full axles and wheel systems to move the icehouses from place to place. One of the problems associated with this has been that often times, in the beginning of the fishing season, the house may be moved out onto ice which later becomes snow covered and can be rather deep, making it very troublesome to remove the icehouse from the ice through the use of the wheels which allowed the ice house to be originally placed. Often times a trailer with skis must be brought out onto the ice or a sled mounted underneath an icehouse so that it may be slid or moved across the surface of the snow to remove it from the ice. Further, with heavier icehouses, plows must be brought out and a trail or road plowed to remove the icehouse from the ice.

The second common example of a wheeled trailer being dragged over snow covered and icy surfaces is the use of small trailers to transport snowmobiles. As snowmobiles are often used and transported around the same types of environments as the above described icehouses, the same sort of problems were encountered during their transport. That is to say, the relatively wide rubber tires that are commonly used in these applications work very poorly in these environments as they tend to push large amounts of snow in front of them in deep snow and lack any kind of directional stability on ice. Therefore, it would be convenient to find a way to easily modify an icehouse or small trailer such that it could be moved across a heavy snow covered surface to get to remote fishing spots as desired or to transport snowmobiles to similar locations.

From this discussion, it can be seen that it would be advantageous to provide a means of easily switching between wheels and skis on icehouses or other trailers as necessary. This method and device is disclosed below.

SUMMARY OF THE INVENTION

It is the primary objective of the present invention to provide a method by which icehouses or trailers can be transported over snow covered and ice surfaces allowing the ice fisherman to position an icehouse in a desired location on the surface of a frozen body of water.

It is an additional objective of the present invention to provide such a method of facilitating the transport of icehouses or trailers over snow covered or icy surfaces by allowing for the replacement of the existing transport wheels on the icehouse with a plurality of bidirectional skis.

It is a further objective of the present invention to provide such a method of attaching skis to icehouses or trailers in such a manner that the procedure can be accomplished by a single person allowing for a high degree of flexibility during the use of the present invention.

These objectives are accomplished by the use of a relatively large and wide ski-like apparatus that can be easily and quickly attached to the axle, or axles, of the larger sized icehouses commonly used today. At this point, it should be stated that this device is equally useful with all types of trailers where it is desirable to move the trailer over a snow covered surface and switch readily between wheels on the trailer or skis. However, for simplicity, the rest of the application refers to icehouses only. As stated, it can be easily see that this device could be equally useful with any type of wheeled trailer without any changes or modifications. As such, this device should not be limited to use only with icehouses but could be used with any sort of trailer. The mounting of skis to the icehouse is accomplished by the use of a ski-like apparatus that is attached to a rim that corresponds in size and lug pattern to an icehouse's existing rims. Therefore, once the icehouse has been transported to the desired body of water over roads or highways by the use of its wheels, the ice fisherman can raise the wheels off of the ground by the use of a common jack and replace the wheels with the present invention. The use of skis on snow covered or icy surfaces reduces the amount of friction created by the icehouse's movement and thus, makes it easier to move it into position on the lake or river's frozen surface.

The present invention itself is based on a tire rim (as described above) that has attached to it the bidirectional ski surface. This attachment is accomplished through the use of two heavy gauge steel rectangular plates that are mounted in a vertical fashion in regards to the short side of the described rectangle; one on the inside and one on the outside surfaces of the tire rim and extending in a downward manner. This configuration thus forms a rectangularly shaped support structure, the bottom side of which is attached to the bidirectional ski at its central flat portion. This attachment is also strengthened by the use of a plurality of attachment bars that extend laterally from each upper corner of the support structure to the outer corners of the angled ski surfaces. These attachment bars add strength and rigidity to not only the invention as a whole, but also function to hold the upper ends of the angled ski surfaces in the proper orientation to provide the bidirectional ski.

The ski surface itself is made of lighter gauge steel or other similar sheet material that is made up of a central flat area and two angled areas on either end of the central flat area. The cental flat area is the portion of the ski that contacts and slides over the snow or ice surface-and the angled surfaces allow the invention, and therefore the icehouse, to be moved either forwards or backwards without the edges of the skis digging into and collecting snow or ice. Additionally, the ski glide surface is also equipped with a tracking keel that extends for its length at its center and which provides direction stability during towing operations. Finally, the bidirectional design of the present invention allows the icehouse to be easily maneuvered into the desired position on the frozen surface of the lake or river.

Additionally, other methods of attaching a ski to an icehouse for transport over snow covered and icy surfaces are also possible. An example of this would be to build an adjustable box into which the tire of an icehouse can be placed and secured. The securement of the tire within the box could be accomplished in any number of ways, one of which would be to use an adjustable strap that is attached at either end to opposite sides of the box. This strap is then used to encircle the top half of an icehouse tire that has been placed in the above described rectangular box. With this accomplished, the strap is tightened around the tire which operates to hold the tire securely within the box.

This adjustable box serves the same additional function as the support structure that was described above which is to provide a means of attaching the ski to the remaining components of the present invention. Therefore, as in the previously described design, the invention serves to provide a means by which a bidirectional ski can be attached to an icehouse allowing it to be easily transported over snow covered and icy surfaces to be positioned in the desired location on the surface of a frozen lake or river.

For a better understanding of the present invention reference should be made to the drawings and the description in which there are illustrated and described preferred embodiments of the present invention.

DESCRIPTION OF THE DRAWINGS

FIG. 3 is a side elevation view of the present invention illustrating the orientation of the rim in relation to the ski and related components of the invention.

FIG. 4 is a top elevation view of the present invention which illustrates the general orientation of the wheel rim in relation to the ski and also the positioning of the support rods between the upper corners of the support structure and the upper corners of the angled ski surfaces.

FIG. 5 is a bottom elevation view of the present invention illustrating the general configuration of the ski and the location of the tracking keel on the central portion of the gliding surface of the ski.

FIG. 6 is a perspective view of an alternative embodiment of the present invention which employs an adjustable box to attach the tires of an icehouse bidirectional ski for transporting it over snow and ice.

FIG. 7 is a side elevation view of an alternative embodiment of the present invention in which the attachment to the icehouse is accomplished by the use of a adjustable box which grasps and securely holds the tire of the icehouse and also provides for the attachment of the ski.

FIG. 8 is a top elevation view of the alternative embodiment of the present invention illustrating the manner in which the icehouse tire fits within the adjustable box and a possible manner by which it is secured therein.

FIG. 9 is a top elevation view of the alternative embodiment of the present invention which illustrates the adjustable manner of the box and the mechanism which makes this adjustability possible.

DESCRIPTION OF THE PREFERRED EMBODIMENT

Figure 1:
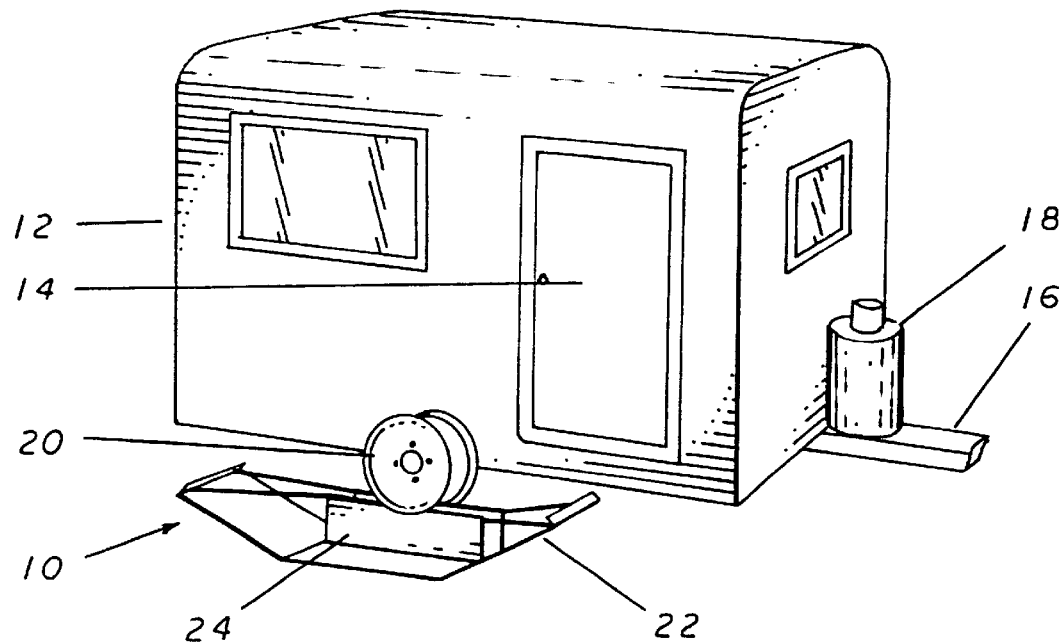
FIG. 1 is a perspective view of a typical icehouse that is equipped with the present invention which illustrates the manner in which the tires of the icehouse are replaced by the ski surfaces of the invention.
Figure 2:
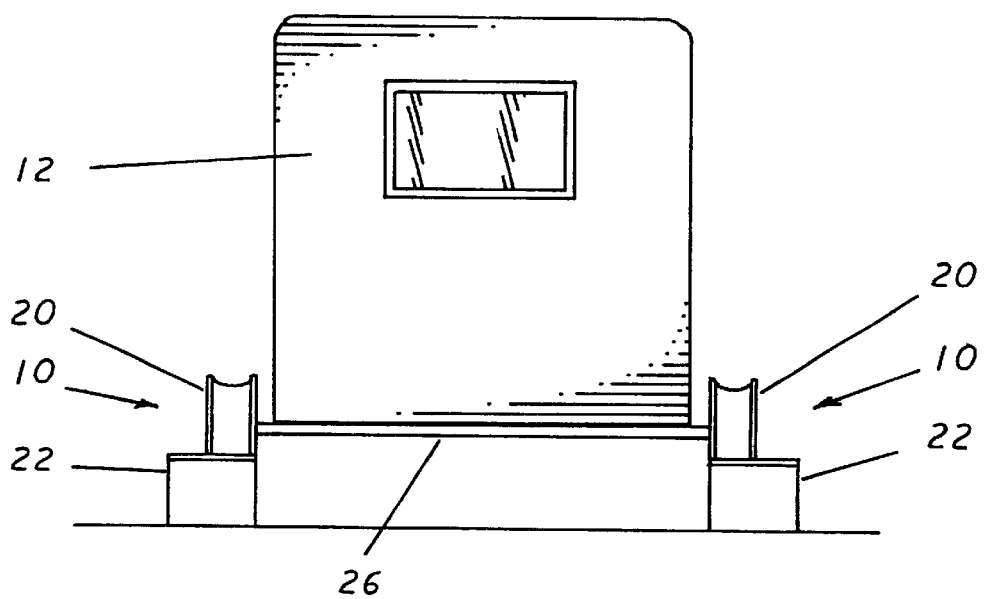
FIG. 2 is a rear elevation view of a typical icehouse that has been equipped with the present invention and illustrating their orientation in regards to the icehouse's axle and related components.

Referring now to the drawings, and more specifically to FIGS. 1 and 2, the removable icehouse ski 10 is used in conjunction with a typical larger sized icehouse 12 that are in common use today. The typical icehouse 12 of larger size is generally equipped with a door 14 which allows the user access to its interior while providing the ability to seal off the outside cold. Additionally, they also are most commonly manufactured with a trailer tongue 16 which allows the icehouse 12 to be attached to and pulled by a transport vehicle. Another feature of these icehouses that illustrates their complexity and corresponding weight is the common presence of a gas bottle 18 which provides fuel for heating and cooking in the interior of the icehouse 12.

All these and other weight contributing features of these icehouses 12 necessitate the use of some sort of transport aiding apparatuses as it is necessary to move the icehouse 12 out onto the ice in early winter and again off the ice in early spring.

Additionally, many people transport such icehouses 12 over roads and highways for storage purposes during the off-season. With these purposes in mind, most of the large icehouses 12 come equipped with one or more axles and a corresponding number of wheels that allow for its transport. The primary problem with this solution is that, while the wheels work excellent on roads and highways, they are inadequate on the snow covered and icy surfaces of frozen bodies of water.

The removable icehouse ski 10 is made up of a tire rim 20, a support structure 24, and a ski 22; the orientation of which are further illustrated in FIGS. 1, 2, 3, and 4. The rim is the component of the present invention which is used to attach it to the axle 26 of the icehouse 12. The rims 20 used for this purpose can vary in design and configuration greatly as the design of the icehouses 12 and their related axles 26 vary from manufacturer to manufacturer. The most notable variance in this regard is the number and placement of the wheel lugs 28 which secure the rim 20 to the axle 26. This problem is addressed by simply matching the wheel lug 28 pattern and rim 20 size to that used originally on the icehouse when initially acquiring the present invention.

The connection of the rim 20. to the ski 22 is accomplished through the use of the support structure 24. The support structure 24 is made up of two heavy gauge steel (or other similar material) rectangular plates known as the inner support frame 40 and the outer support frame 42. These inner and outer support frames, 40 and 42, are mounted vertically on their upper surfaces, with reference to the short side of the above described rectangle, respectively to the inside and outside edges of the rim 20. This configuration forms an open ended rectangularly shaped box that extends downward from the lower surface of the rim 20. It is the lower surface of this rectangular box, or the support structure 24, to which the upper surface of the ski 22 is attached.

The ski 22 is generally separated into two areas, the centrally located ski glide surface 36 and the two angled ski surfaces 34 located both fore and aft of the ski glide surface 36. The ski glide surface 36 is the portion of the ski 22 that is in contact with the surface of the snow or ice over which the icehouse 12 is being moved during transport. With this function in mind, it is constructed as a wide flat apparatus that both glides easily over snow covered and icy surfaces but also provides the necessary stability to the icehouse 12 during its transport.

As stated above, the angled ski surfaces 34 are located on either end of the ski glide surface 36 and both angle up and away from their point of connection. The primary purpose of the angled ski surfaces 34 is to keep the edges of the ski glide surface 36 from digging into the surface of the snow or ice as it moves across it. This design purpose is accomplished by using the angled ski surfaces 34 to close off the ends of the ski glide surface 36. Additionally, the angled ski surfaces 34 extend far enough up and away from their point of connection to the ski glide surface 36 to ensure that the present invention will glide unimpededly over the top of any snowdrifts encountered during transport. Finally, the use of the angled ski surfaces 34 on both ends of the ski glide surface 36 gives the present invention its bidirectional capability as one or the other performs its designed function irrespective of wether the icehouse 12 is moving forwards or backwards.

The upper outside corners of each of the angled ski surfaces 34 are secured in the proper position by the use of the inner support rods 38, attached to the inner corners of the angled ski surfaces relative to the icehouse 12, and the outer support rods 32, attached to the outer corners of the angled ski surfaces relative to the icehouse 12. The manner of construction of the inner and outer support rods, 38 and 32, can vary depending on design parameters but they are generally made of steel rod or tubing.

The attachment of the inner and outer support rods, 38 and 32, is facilitated by the placement of the tip angle iron 30 on the outer most surface of each of the angled ski surfaces 34. The addition of the tip angle iron 30 creates an inside 90 degree angle that provides a two surface point of attachment to cradle the outward ends of the inner and outer support rods, 38 and 32. This design strengthens the attachments at these points which adds structural rigidity to the overall body of the present invention.

The bottom surface of the ski 22 is further illustrated in FIG. 5 and details the use of specific materials in its construction which aid the invention in its accomplishment of its intended purposes. The first of these is the plastic wear plate 44 which covers the entirety of the lower surfaces of the ski glide surface 36 and the angled ski surfaces 34. The plastic wear plate 44 is typically composed of a sheet of agriculture-grade polymer plastic of an appropriate thickness to provide the desired wear and friction coefficients. However, the plastic wear plate 44 could also be made of any other similar material that provides the desired combination of long surface wear and low drag.

The plastic wear plate 44 is attached to the bottom surface of the ski 22 by the use of a plurality of shoulder bolts 48 which encircle the perimeter of the plastic wear plate 44. The most important feature resulting from this method of attachment is the shoulder bolts which allow the plastic wear plate 44 to be removed and replaced when it has worn out which adds useful life to the present invention overall.

Finally, the bottom surface of the ski 22 is also equipped with a tracking keel 46 which runs longitudinally down the center of the ski glide surface 36. The purpose of the tracking keel 46 is to provide directional stability to the present invention as it is employed to move an icehouse 12 over snow covered or icy surfaces. This is accomplished as a result of its straight and protruding nature, in relation to the body of the invention, which forces the ski 22 to run in a straight line unless a force is applied to change its direction. The tracking keel 46 is most commonly made from an extremely hard metallic substance and also attached to the bottom of the ski 22 in a manner that allows it to be removed and replaced when necessitated by wear. Again, this adds life to the use of the present invention as it allows wear prone parts to be replaced when needed without having to replace the entire unit.

An alternative embodiment of the present invention is illustrated in FIGS. 6, 7, 8, and 9 which detail the use of a strap on icehouse ski 49 in place of the removable icehouse ski 10 described above. This embodiment allows the user to attach a ski 22 directly to an icehouse wheel 50 that has been used to transport the icehouse 12 over roads and highways. This embodiment of the invention replaces the support structure 24 of the prior embodiment with an adjustable support structure 51 which serves both as a mounting place for the ski 22 and as a manner of attaching the strap-on icehouse ski 49 to the body of the invention.

The adjustable support structure 51, much like the support structure 24 as described above, contains two rectangularly shaped heavy gauge steel plates that are vertically oriented with respect to their short edges and form a rectangularly shaped open ended box, or the body of the adjustable support structure 51. The lower surface of the adjustable support structure 51 provides the mounting point for the ski 22 as the upper surface of the ski glide surface 36 is permanently fixed to it. The vertically oriented plates are known, as with the support structure 24 above, as inner support and outer support frames, 38 and 40, and are fixed in their positions relative to the remaining components of the present invention.

Inside either open end of the adjustable support structure are located the wheel diagonal plates 58. The wheel diagonal plates 58 are the components of the adjustable support structure 51 that position and hold the icehouse wheel 50 in the proper location within the present invention. The wheel diagonal plates 58 are generally square shaped plates that are attached within the inner and outer support frames, 40 and 42, in a diagonally outward manner with reference to their lowest points at the confluence of the adjustable support structure 51 and the ski 22. Conversely, the upper ends of the wheel diagonal plates 58 extend well above the upper surface of the adjustable support structure 51, thus, forming a V-shaped structure within which the icehouse wheel 50 fits into during the attachment of the present invention.

The adjustable support structure 51 also contains the lateral adjustment plate 60 in the space created between the inner and outer support plates, 40 and 42. The lateral adjustment plate 60 is the component of the present invention which is employed to hold the icehouse wheel 50 within the adjustable support structure 51 along its edges to keep it from moving laterally during transport operations. This is accomplished by mounting the lateral adjustment plate 60 along a pair of adjustment bolts 62 which are relatively evenly spaced and span the gap between the inner and outer support plates, 40 and 42 and pass through corresponding holes in the surface of the lateral adjustment plate 60.

The terminal point of the adjustment bolts 62 is held in place by the use of the outer adjustment bolts 66 and the location of the lateral adjustment plate 60 is determined by the positioning of the inner adjustment bolts 68 which sandwich the lateral adjustment plate 60 along the adjustment bolts 62. The position of the lateral adjustment plate 60 within the adjustable support structure 51 is altered by changing the position of the inner adjustment bolts 68 with respect to the adjustment bolts 62. The movement that results from these adjustments is represented by the directional arrows 70 in FIG. 9 and which illustrates the manner by which the interior of the adjustable support structure 51 can be altered through the use of the lateral adjustment plate 60 in conjunction with the wheel diagonal plates 58 to grasp and hold icehouse wheels 50 of varying sizes. This allows this embodiment of the present invention to be fitted to an icehouse wheel 50, or the wheel of other similar small trailers, to facilitate its transport over snow covered or icy surfaces.

The securement of the icehouse wheel 50 within the adjustable support structure 51 is accomplished looping the attachment strap 52 over the upper portion of the icehouse wheel 50 and cinching it down by the use of the strap adjuster 64. The use of the attachment strap 52 ensures that the position of the present invention will not be altered in regards to the icehouse wheel 50 even in circumstances where abrupt vertical changes in orientation are encountered. The attachment strap 52 is secured at either end to the upper surfaces of the wheel diagonal plates 58. These attachments are accomplished through the use of a strap bracket 56 which is an L-shaped component extending outward from the wheel diagonal plate 58. The strap bracket 56 then provides the point of attachment for the strap loops 54 which in turn provide the points of attachment for the ends of the attachment strap 52. This configuration allows the icehouse wheel 50 to held securely within the adjustable support structure 51 that allows this embodiment of the present invention to be used to facilitate the transport of such icehouses 12 or trailers over snow covered or icy surfaces.

Although the present invention has been described in considerable detail with reference to certain preferred versions thereof, other versions are possible. Therefore, the spirit and scope of the appended claims should not be limited to the description of the preferred versions contained herein.

What is claimed is:

1. A removable ski assembly for use on trailers having an attachment point for wheels via standard wheel lugs, said removable ski assembly comprising:

a ski having an upwardly curving forward section, a middle ski glide surface, and a rear section;

an inner support frame plate and outer support frame plate said support frame plates extending perpendicularly upward from said middle ski glide surface and running from said forward section of said ski toward said rear section of said ski;

a plurality of support rods attaching said support frames to said forward section of said ski and said rear section of said ski;

said rear section of said ski is an upwardly curving section and said support rods connect said upwardly curving forward section and said upwardly curving rear section to said support frame plates;

an adjustable support structure for accepting and attaching to a wheel attached to said attachment point for wheels; and a movable adjustment plate in said adjustable support structure.

2. A removable ski assembly as in claim 1 further comprising a plastic based wear plate fixedly attached to the lower surface of said ski.

3. A removable ski assembly as in claim 2 further comprising an attachment strap assembly for holding said wheel in said adjustable support structure.

4. A removable ski assembly for use on trailers having wheels, said removable ski assembly comprising:

a ski having an upwardly curving forward section, a middle ski glide surface and a rear section;

an inner support frame plate and outer support frame plate said support frame plates extending perpendicularly upward from said middle ski glide surface and running from said forward section of said ski toward said rear section of said ski;

a plurality of support rods attaching said support frames to said forward section of said ski and said rear section of said ski; and an adjustable lateral support parallel and between said inner and outer support frame plates for receiving a wheel on the trailer.

5. A removable ski assembly as use on trailers as in claim 4 such that said lateral support can move between said inner and outer plates while remaining parallel to said inner and outer plates.

6. A removable ski assembly for use on trailers as in claim 5 wherein said lateral support is adjustable via adjustment bolts running perpendicular through said lateral support and said inner and outer support frame plate.

7. A removable ski assembly for use on trailers as in claim 6 further comprising an attachment strap assembly for holding said wheel between said lateral support and said inner support frame plate.

8. A removable ski assembly for use on trailers as in claim 7 wherein said rear section of said ski is an upwardly curving section.

9. A removable ski assembly for use on trailers as in claim 8 wherein said plurality of support rods connect said upwardly curving forward section and said upwardly curving rear section to said support frame plates.

10. A removable ski assembly for use on trailers as in claim 9 further comprising a plastic based wear plate fixedly attached to the lower surface of said ski.

* * * * *